W. H. POWERS.
COMBINED SAND SPRINKLER AND VEHICLE.
APPLICATION FILED SEPT. 27, 1915.
1,177,052.                                         Patented Mar. 28, 1916.
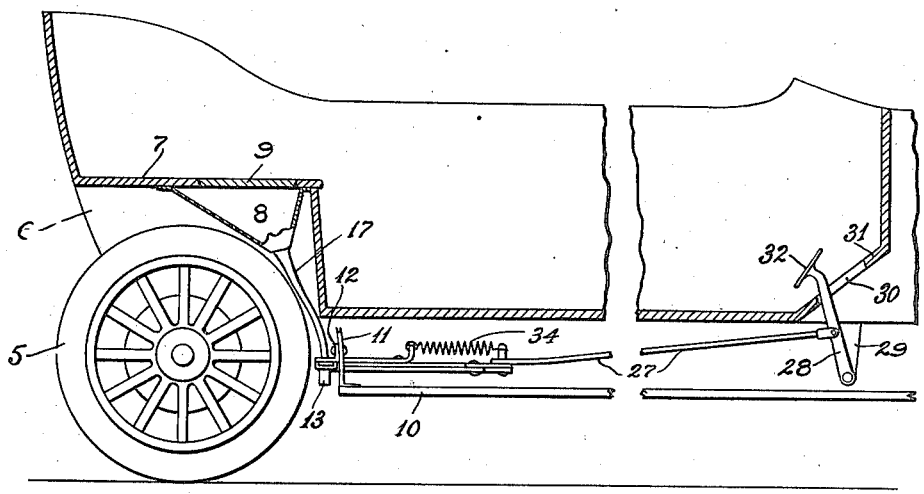
Fig. 1
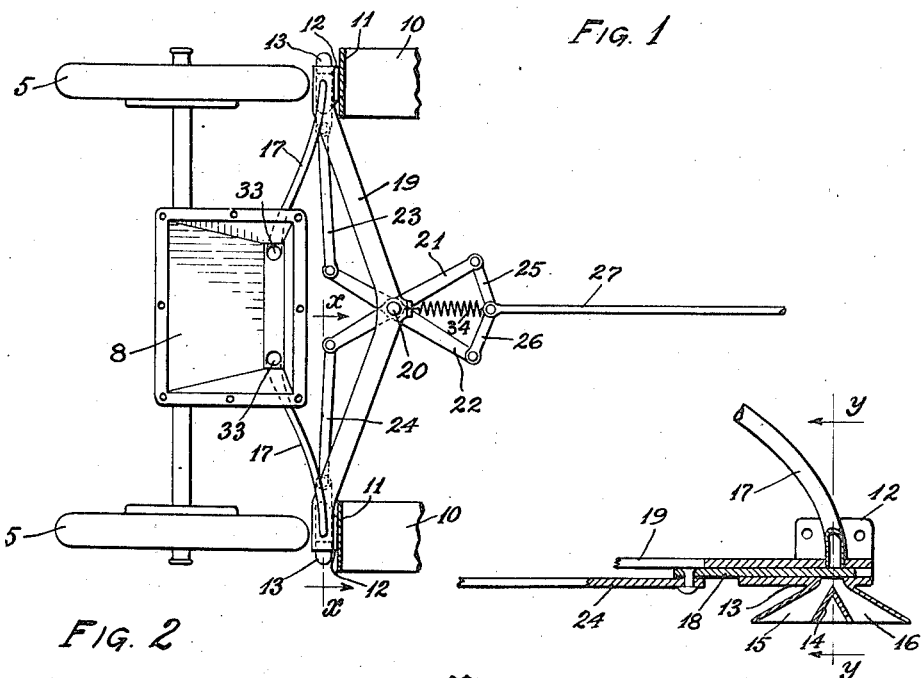
Fig. 2
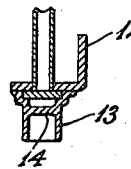
Fig. 4
Fig. 3
WITNESSES:
O. Johnson
Frank Warren
INVENTOR
William H. Powers
BY
C. D. Haskins
ATTORNEY

UNITED STATES PATENT OFFICE.

WILLIAM H. POWERS, OF SEATTLE, WASHINGTON, ASSIGNOR OF ONE-HALF TO JOHN R. REED, OF SEATTLE, WASHINGTON.

COMBINED SAND-SPRINKLER AND VEHICLE.

1,177,052.   Specification of Letters Patent.   Patented Mar. 28, 1916.

Application filed September 27, 1915. Serial No. 52,785.

*To all whom it may concern:*

Be it known that I, WILLIAM H. POWERS, citizen of the United States, residing at Seattle, in the county of King and State of Washington, have invented a certain new and useful Improvement in Combined Sand-Sprinklers and Vehicles, of which the following is a specification.

My invention relates to improvements in lever-controlled sand distributing devices embodied in vehicles, and the object of my improvements is to provide a vehicle, as, for instance, an automobile, with devices which shall be adapted to be operated in response to the movements of a lever, at required times during the travel of said vehicle, to sprinkle sand, or other gritty material over those portions of the surface of a road-bed adjacent to and upon the normal path of the wheels of said vehicle and in advance thereof, whereby when said vehicle is turned from a straight course and centrifugal force causes its wheels to depart from their normal path then the tires of said wheels may engage with such adjacent sand-sprinkled portions of said road-bed, said wheels thereby being prevented from skidding farther from their normal path.

I accomplish this object by devices illustrated in the accompanying drawings wherein—

Figure 1 is a view in side elevation and partly in a lengthwise vertical section showing portions of an automobile with which my invention is associated; Fig. 2 is a plan view of parts of the same; Fig. 3 is an enlarged view of parts of the same in vertical section on broken line $x$, $x$ of Fig. 2; and Fig. 4 is a fragmentary view in vertical section of parts of the same on broken line $y$, $y$ of Fig. 3.

Referring to the drawings, throughout which like reference numerals indicate like parts, 5 indicates the pneumatic tires of the rear wheels which support the rear end portion of the body 6 of an automobile which is provided with a rear seat 7 to the under surface of which is secured the flanged top edges of a container 8, said seat 7 thus serving as a top wall of said container 8, and said seat 7 is provided with a removable portion 9 which serves as a cover to close an opening that extends therethrough into the container 8, through which opening sand or other desired gritty material may be poured to fill said container when said portion 9 is removed.

Secured to a running board 10 on each side of the body 6, of the automobile, is a fender 11 to which is fastened a bracket 12 which is integral with a nozzle 13 within whose mouth is a deflector 14 of angular form disposed with its apex projected inwardly, as shown in Fig. 3, thus to form two outlet passageways 15 and 16 whose side walls flare outwardly, which passageways 15 and 16 unite at the apex of said deflector 14 to form a single passageway which communicates with a conduit pipe 17.

Within the nozzle 13 is a shut off slide-valve 18 which is operatively disposed to control the passageway leading from the conduit pipe 17 into the two passageways 15 and 16 whereby sand from the conduit pipe 17 may be permitted to flow into the two passageways 15 and 16 at a desired rate or be wholly shut off therefrom as may be desired.

The nozzles 13 are disposed each directly in front of the periphery of a different one of the tires 5 and are integrally connected by a transverse brace-bar 19 to the central portion of which brace-bar 19 is pivoted, by a pivot bolt 20, two levers 21 and 22, and the rear end of the lever 21 is articulated with one end of a connecting bar 23 which extends to and is articulated with the inner end of the adjacent one of the shut off slide-valves 18 of the nozzles 13 while the rear end of the lever 22 is articulated with one end of a connecting bar 24 which extends to and is articulated with the inner end of the shut off slide-valve 18 of the oppositely disposed one of the nozzles 13.

The forward ends of the levers 21 and 22 are articulated respectively with toggle links 25 and 26 to which is articulated the rear end of a connecting rod 27 which extends forwardly to a point where its forward end is articulated with a foot lever 28 which is pivotally mounted on a bracket 29 that is fastened to the under portion of the body 6, which foot lever 28 extends upwardly through an oblong hole 30 to project its upper end above a footboard 31 in front of the operator's seat, the projecting upper end of said foot lever 28 being provided with a foot-piece 32 that may be engaged by the operator's foot in the operation of moving the foot lever 28 forward to cause the connecting rod 27 to actuate the toggle links 25 and 26 to cause them to move the levers 21 and 22 thus to draw inwardly the connecting bars 23 and 24 to move the shut off slide-valves 18 to permit sand to flow from the conduit pipes 17 into and through the respective nozzles 13.

The container 8 is of hopper-like form and through its bottom wall are holes 33 each of which leads into the upper end of a different one of the conduit pipes 17 as shown more clearly in Fig. 2.

In order that the foot lever 28 may be moved backwardly when the operator's foot is disengaged from the foot-piece 32 thereby to move the shut off valves 18 to close the passageway in the nozzle 13, I have provided a helical retractile spring 34 which is connected between the brace-bar 19 and the toggle links 25 and 26 to adapt it to tend always to maintain the toggle links in a position to keep the shut off valves 18 in their positions to close the passageways through the nozzles 13 in an obvious manner.

The flared walls of the mouths of the nozzles 13 and the respective deflectors 14 disposed therein adapt said nozzles 13 to cause sand flowing therethrough to spread only over those portions of the surface of the road-bed on each side of the normal paths of the tires 5 when the shut off valves 18 are wide open thus to prevent skidding from the normal path, but when such shut off valves 18 are only slightly opened then sand, having little momentum, will drop directly downward on to the normal paths of the tires 5 thus to increase the traction of the tires 5 as they travel over their normal paths.

Manifestly, any form of container may be substituted for the container 5 and it may be disposed in one of different positions in an automobile; and the nozzles 13 may be provided with different forms of foot-lever actuated shut off valves and other parts may be changed in forms, dimensions and arrangement without departing from the spirit of my invention.

What I claim is:

In a device of the class described, the combination with an automobile, of a receptacle for sand; separate conduit pipes connected with the bottom wall of said receptacle and extending downwardly thereupon each to a point in front of and adjacent to the periphery of a different one of the two traction wheels of said automobile; a brace-bar secured to the chassis of said automobile in a position transversely thereof to extend from the lower end of one of said conduit pipes to the lower end of the other conduit pipe; a slide valve secured to each end portion of said brace-bar and connected with the outlet end of the adjacent conduit pipe; a nozzle secured to the underside of each of said slide valves, said nozzle having two flared outlets to adapt it to diffuse sand flowing downwardly therethrough; two levers disposed crosswise of each other, and pivotally fulcrumed to the central portion of said brace-bar; two connecting bars disposed each to pivotally connect the rear end of a different one of said levers with the slidable shut-off member of a different one of said slide valves; a pair of toggle links pivotally connected to and extending between the forward end portions of said two levers; a foot lever pivotally associated with the forward portion of said chassis and disposed to extend upwardly to adapt it to be accessible to an operator's foot; a connecting rod having one of its ends articulated with said foot lever, and its other end articulated with the adjacent ends of said toggle links; and retractile means associated with said connecting rod whereby said foot lever may be maintained normally in its rearwardmost position and said slide valves be maintained normally in a closed position.

In witness whereof, I hereunto subscribe my name this fifteenth day of September A. D., 1915.

WILLIAM H. POWERS.

Witnesses:
A. HASKINS,
BENJ. F. SOUTHER.